Oct. 12, 1926. Re. 16,439
P. W. PRUTZMAN
PROCESS FOR DECOLORIZING AND STABILIZING OILS
Original Filed April 19, 1921
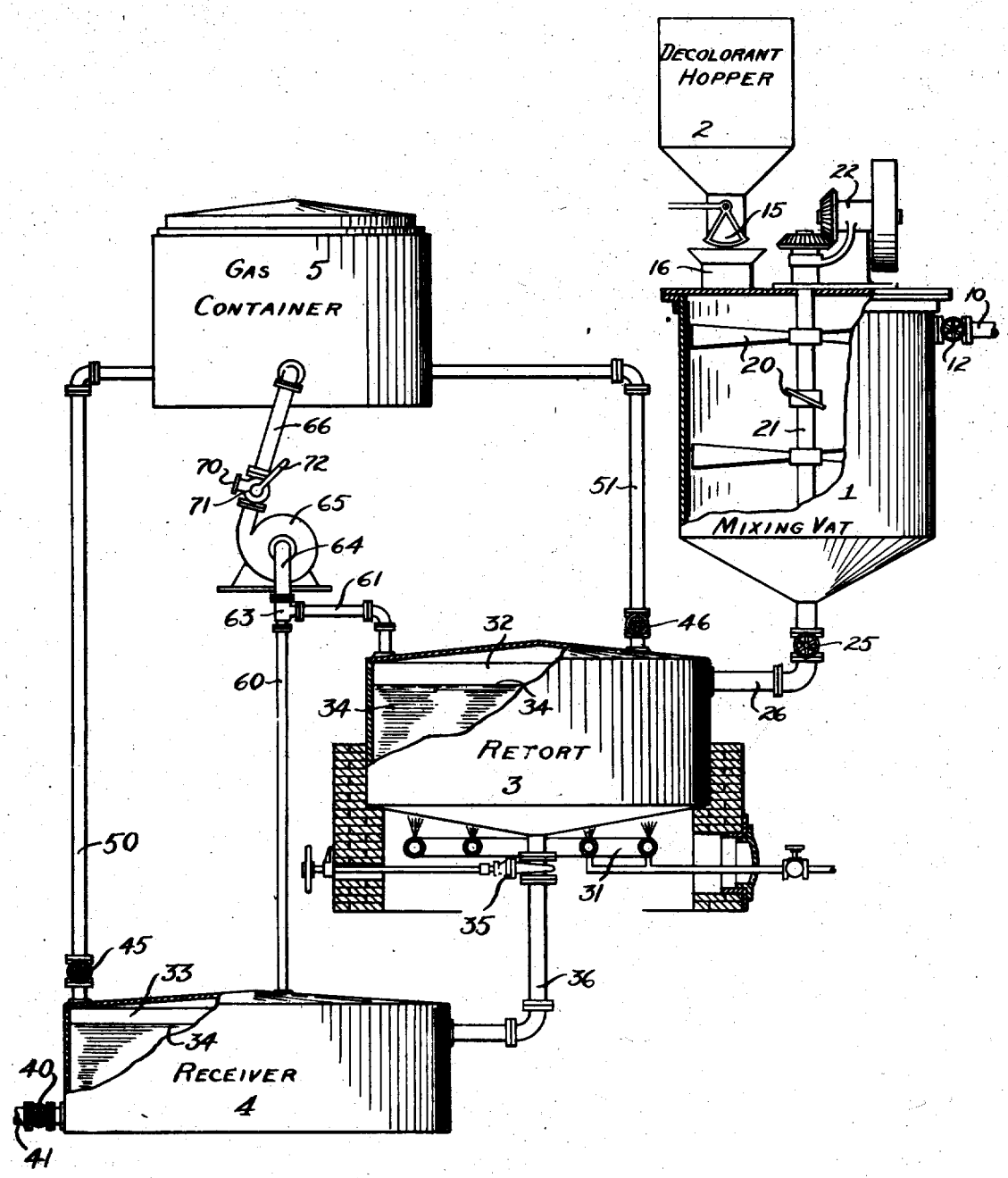
INVENTOR
PAUL W. PRUTZMAN
BY
Harry A. Toller
ATTORNEY Reissued Oct. 12, 1926.

Re. 16,439

UNITED STATES PATENT OFFICE.

PAUL W. PRUTZMAN, OF LOS ANGELES, CALIFORNIA, ASSIGNOR TO GENERAL PETROLEUM CORPORATION, A CORPORATION OF CALIFORNIA.

PROCESS FOR DECOLORIZING AND STABILIZING OILS.

Original No. 1,547,682, dated July 28, 1925, Serial No. 462,670, filed April 19, 1921. Application for reissue filed September 8, 1926. Serial No. 134,321.

This invention relates to processes wherein oils are decolorized by the admixture therewith of a decolorant material which absorbs certain constituents of such oils and the decolorant material being afterward separated from the base oil. The resulting product is an oil of much lighter color than the untreated oil and therefore of more commercial value.

My invention has for its object the provision of a process whereby such operations may be performed with greater facility than heretofore possible and with a material reduction in the amount of materials required to produce the desired change in color.

In the present state of the art of decolorizing oils, the decolorant materials are mixed with the oil in an agitator wherein the mixture is thoroughly agitated to allow the decolorant to act upon the body of oil. Heretofore it has been considered necessary to perform such operations at temperatures below 250° F. as oxygen from the air combines with the oil if present when the oil is more highly heated and causes a darkening of the product which partially offsets the work performed by the decolorant.

The objects of my invention are attained by subjecting the oils to decolorizing processes under temperatures up to 800° F. which is made possible, as hereinafter set forth, by excluding air from contact with the oil while the oil being decolorized is in this highly heated condition, the means for excluding air being the passage of an oxygen free gas, or vapor over the surface of the heated oil during the operation.

If the oils to which my invention is applied are heated to a moderately elevated temperature, say 250° F. in contact with an adsorbent decolorizing agent, a certain degree of decolorization or reduction in color is obtained. I have discovered that at progressively higher temperatures the color is progressively further reduced, (by the use of the same proportion of decolorant) up to a certain point which varies with different oils, but which is usually above 500° F., and is often much higher. This increased decolorizing activity of the decolorant has been demonstrated in the experiments leading up to my invention and is very important, the value of certain decolorants at moderately high temperatures, say 250° F. being multiplied from 3 to 5 times when the oil with the decolorant present therein, is heated to a temperature of say 600° F., thus correspondingly reducing the amount and cost of the decolorant consumed and to be handled and of oil loss by entrainment in the spent decolorant.

The reason for this increase in decolorizing value of the adsorbent at high temperatures seemingly resides in the increased molecular activity of the oil at increased temperatures in deeper penetration of oil into the grains of the decolorant, in the more complete disengagement of adsorbed air and gases from the decolorant, and in certain condensations of the colored bodies in the oil by which they are rendered more amenable to adsorption by the decolorant.

When the oils to be treated under my invention have the temperature thereof raised much in excess of 250° F., while exposed to contact with the air, they enter into combination with the oxygen thereof, with the formation of dark colored and odorous bodies, by which the bleaching action of the decolorant is in part offset and nullified. At still higher temperatures this oxodizing reaction becomes more rapid and complete, and at the temperatures (mainly above 350° F.,) at which I prefer to work, this oxidation will entirely nullify the action of the decolorant and destroy the commercial value of oil product, if air is allowed access to the oil while so highly heated. These objectionable features are all eliminated when working under my invention with oils, the temperatures of which are raised much in excess of 250° F., due to the fact that I prevent the access of air to the oil by means of, or through the medium of, a stream of flow current of a non-oxidizing gas or vapor passed over the surface of the oil and in the manner as hereinafter set forth.

When oils with an adsorbent intermixed therewith are treated under temperatures much in excess of 250° F., they crack or in other words, suffer a heat decomposition, by which decomposition products of a volatile nature, of an offensive odor and subject to oxidation and darkening on exposure to air at ordinary temperatures, are formed, These products, if allowed to remain in the oil, will render it valueless by reason of their odor and thus the color of the oil will be unstable. Under my method invention for the treatment of oils in the presence of an adsorbent material, these products are volatilized and thrown out of the oil by the high temperatures used, most readily at a temperature of above 350° heat, and are then swept off and carried away by the stream of gas passing over the surface of the heated oil, the oil being maintained excluded from contact with the atmosphere during the period of treatment. By this means the color of the oil is stabilized, and any objectionable odor due to a cracking of the oil, is removed, and as air is likewise excluded or maintained out of contact with the oil, the full increase in value of the decolorant at elevated temperatures is realized, and the desired economy of material attained, thereby permitting a given quantity of oil to be treated with a less or smaller quantity of adsorbent than heretofore, and the production of an oil of a better color and permanency than otherwise would take place or result.

Any suitable form of an apparatus may be employed for the carrying out of the method invention. I have illustrated in the accompanying drawings a simple, efficient and practical apparatus for the carrying out of the invention, wherein the said apparatus is disclosed diagrammatically, portions of certain parts thereof being broken away.

The apparatus used comprises a decolorant mixing vat 1 which is supplied with decolorant from a hopper 2, a retort 3 in which the oil and decolorant may be raised to the desired temperature, a receiver 4 in which the oil and decolorant may fully function and the mixture may be allowed to cool sufficiently to permit its being transferred to the final process of separation, a gas tank 5 from which a non-oxidizing gas is supplied to the various pieces of apparatus to displace the air which would otherwise react with the oil.

As oil at comparatively low temperatures does not readily enter into reaction with oxygen, it is unnecessary to exclude air from the mixing vat 1. The oil to be decolorized is supplied to the mixing vat 1 from any exterior source not shown through an inlet pipe 10 and a valve 12 and is thoroughly mixed with decolorant supplied from the hopper 2 having a control gate 15 which discharges into the feed spout 16. The agitation is accomplished by blades 20 mounted upon a shaft 21 and revolved by any suitable gearing arrangement 22.

From the mixing vat 1 the oil and decolorant mixture is transferred to the retort 3 through the valve 25 and the piping 26. In the retort 3 the mixture is raised to the desired temperature by heat supplied by any suitable means such as a burner 31, and throughout the heat application the remaining space 32 within the retort is maintained full of the non-reactive gas, as will hereinafter be explained, and oxidation of the heated oil is thereby prevented.

The heated mixture is then carried through a valve 35 and transfer piping 36 to the receiver 4 wherein it is also kept under non-oxidizing conditions until the decolorant has fully absorbed the undesirable coloring materials from the oil and the mixture has cooled sufficiently to allow its transfer through a valve 40 and outlet piping 41 to suitable means of separation, not shown.

As it is desirable to introduce the mixture from the agitation process in mixing vat 1 into the retort 3 and the receiver 4 under conditions that will not cause the oxidation of same, valves 45 and 46 in gas supply lines 50 and 51 are opened to allow free passage of non-oxidizing gas from the container 5 into these chambers to effect the removal of the air therein contained. A continuous circulation of the gas is provided for by the return lines 60 and 61 which meet at a T 63 and are connected to a pipe 64 leading to a centrifugal blower 65 having connection with the container 5 through piping 66. In starting the apparatus, the blower 65 exhausts the air content of the retort 3 and the receiver 4 through the return piping 60 and 61 and discharges same through the outlet port 70 of a three-way valve 71 in the line 66, and the gas entering the retort and the receiver through the valves 45 and 46 displaces the air as it is exhausted by the blower and follows said air up through the return pipes 60 and 61. When gas begins to flow through the port 70 of the valve 71, the operating lever 72 is actuated and the flow of gas is directed through the piping 66 into the container 5. The mixtures entering the retort 3 and the receiver 4 are maintained at all times under non-oxidizing conditions due to the continuous circulation of the non-reactive gas through the remaining spaces 32 and 33 above the mixture levels as indicated at 34.

The application of the extremely high temperatures herein used very materially increase the absorbing qualities of the decolorant, thereby decreasing the amount required to accomplish the desired results as well as greatly reducing the time required for performance.

The above process is applicable to the decolorizing of oils by clay, kaolin, fuller's earth, filtering clay, bone or other animal or vegetable char, or any other equivalent decolorizing agent.

While I have described the preferred means of maintaining the oil during treatment out of contact with the atmosphere, and the preferred means for removing such gaseous vapors as may be thrown off from the oil while treated in the presence of adsorbent material at higher temperatures than are referred to, and the minimum temperature of which is approximately 350° F., I do not wish to be understood as restricting or limiting my method of invention to such particular means, inasmuch as my invention resides in, and that which I wish to be understood as claiming as broadly as the state of the art will permit, the method of treating a body of oil in the presence of an adsorbent material, which consists in heating while maintained out of contact with the atmosphere a body of oil intermixed with an adsorbent to cause an appreciable decomposing of the oil, and subjecting the heated oil while maintained out of contact with the atmosphere to a flow stream of nonoxidizing medium for removing or carrying away any gaseous vapors which may be thrown off from the oil during its treatment.

I claim as my invention:

1. The method of purifying and partly decolorizing hydrocarbon oils which consists in intermixing with the oil to be treated a powdered solid adsorbent, heating the mixture in a substantially closed vessel to a temperature at which the oil decomposes appreciably, to permit the adsorbent to withdraw the maximum quantity of coloring matter from the oil, steaming the hot mixture to carry off the decomposition products evolved, and finally separating the spent adsorbent and its contained coloring matters from the decolorized oil remaining in the vessel by mechanical means.

2. The method of purifying and partly decolorizing hydrocarbon oils which consists in intermixing with the oil to be treated a powdered solid adsorbent, heating the mixture in a substantially closed vessel to a temperature above 350° F. to permit the adsorbent to withdraw the maximum quantity of coloring matter from the oil, steaming the hot mixture to carry off the decomposition products evolved and finally separating the spent adsorbent and its contained coloring matters from the decolorized oil remaining in the vessel by mechanical means.

In testimony whereof, I have hereunto set my hand at Los Angeles, county of Los Angeles, State of California, this 28 day of June, 1926.

PAUL W. PRUTZMAN.